Sept. 29, 1925.
H. A. NIBECKER
1,555,512
PROCESS FOR RECOVERING POTASSIUM AND LIKE
COMPOUNDS FROM ORGANIC MATERIALS
Filed Dec. 16, 1924
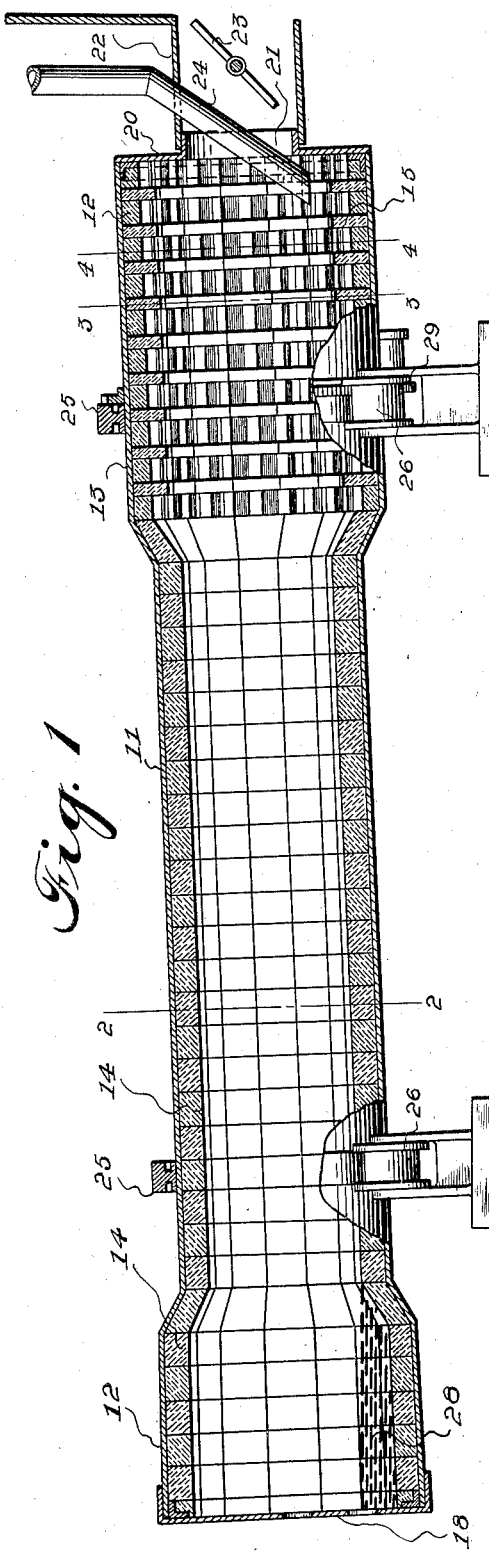
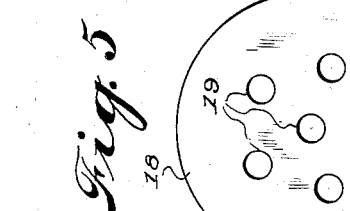
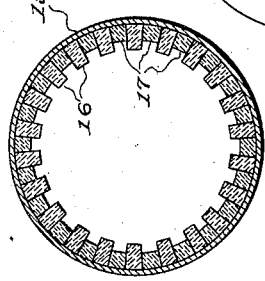
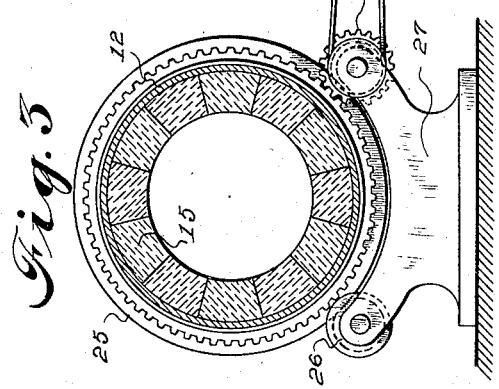
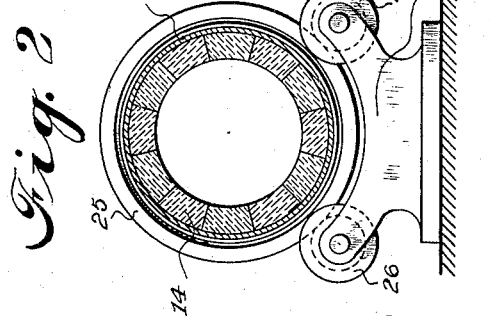
Inventor
Howard A. Nibecker
By William A. Strauch
Attorney Patented Sept. 29, 1925.

1,555,512

UNITED STATES PATENT OFFICE.

HOWARD A. NIBECKER, OF AGNEW, CALIFORNIA.

PROCESS FOR RECOVERING POTASSIUM AND LIKE COMPOUNDS FROM ORGANIC MATERIALS.

Application filed December 16, 1924. Serial No. 756,338.

*To all whom it may concern:*

Be it known that I, HOWARD A. NIBECKER, a citizen of the United States, residing at Agnew, in the county of Santa Clara and State of California, have invented certain new and useful Improvements in Processes for Recovering Potassium and like Compounds from Organic Materials, of which the following is a specification.

The invention relates to a method of reducing organic materials containing potassium and like chemical compounds into ash form, particularly such waste materials as the liquid or semi-liquid refuse resulting from the extraction of sugar, the residue of the fermentation of molasses, black strap, and the like.

One of the objects of the invention resides in the inspissation or evaporation of the moisture carried by such materials by effecting a dissemination or dispersion thereof, and simultaneously contacting the disseminated particles with a heated gaseous medium, such as air and combustion gases.

Another object of the invention resides in the reduction of such materials to ash form utilizing the combustible constituents thereof when sufficient in quantity, as the sole source of heat energy to carry out the process after combustion has been initiated by extraneous fuel; and when the organic matter in the material is insufficient to supply the necessary heat energy, to continuously supply enough extraneous fuel to make up for the deficiency in the waste materials and to maintain combustion.

A further object of the invention resides in maintaining the material under treatment in a constant state of agitation.

Further objects of the invention will appear hereinafter in the detailed disclosure of a preferred embodiment of the invention.

It is well known that many waste materials, particularly the refuse resulting from the extraction of sugar from beets, the residue of the fermentation of molasses, black strap, and the like contain organic matter in addition to potassium in the form of various compounds. It has been proposed to recover the potassium from such waste material by placing the liquor or syrup in evaporating pans and then carbonizing the evaporated mass in closed retorts, reducing the same to ash, and then recovering the potassium from the ash. It has also been proposed to recover the potassium contained in such waste materials by numerous chemical treatments.

I have found that in many instances, such materials can be readily reduced to ash form by eliminating the moisture contained therein and effecting the conversion of the organic matter to ash by causing the combustion of such matter without the use of any heat generating medium, as fuel, other than that necessary to initiate the combustion. The evaporation or elimination of the moisture from such waste materials is preferably effected by causing a dispersion of the said materials and simultaneously contacting the dispersed mass with a heated gaseous medium, as a mixture of air and combustion gases, while maintaining the dispersed material in a constant state of agitation. As the moisture is evaporated or expelled from the dispersed material the organic matter ordinarily forming the greater part of such waste material becomes ignited due to the fact that the gaseous medium with which it is contacted is of sufficient temperature to initiate combustion of the dehydrated mass under treatment. The combustion of the organic matter is propagated and maintained by causing a combustion supporting medium such as oxygen or air to intimately commingle with the ignited mass. When treating materials which have a deficient supply of combustible organic material, just enough extraneous fuel may be supplied to maintain combustion of the mass. By treating such waste materials according to my process, reduction to ash form is effected in a more efficient, simple and economical manner that has heretofore been attained.

My process is preferably continuously carried out in a unitary heat structure or apparatus which includes a tubular kiln made up of a central section disposed between two end sections, the diameters of the end sections being larger than that of the central section, the kiln being disposed at an incline and suitably mounted for rotation.

The upper end section of the inclined kiln is provided with baffle projections extending radially from its inner circumference, and also includes means for controlling admission of air to the kiln, and means for introducing the material to be treated at its open end. The purpose of the baffle construction is to cause a thorough and intimate commingling of the waste materials and the heated gases. The lower end section is provided with a cover plate having a number of openings therein for the admission of air.

An embodiment of the preferred apparatus adapted for carrying out my process is illustrated by way of example in the accompanying drawing in which—

Fig. 1 is a vertical longitudinal sectional view of my preferred apparatus.

Fig. 2 is a view in transverse section through the body of the kiln on the line 2—2 of Fig. 1.

Fig. 3 is a view in transverse section through the kiln on the line 3—3 of Fig. 1.

Fig. 4 is a view in transverse section through the kiln on line 4—4 of Fig. 1.

Fig. 5 is an end view of the lower section of the kiln showing the plate provided with air vents.

Referring to the drawings, the kiln comprises a central section 11 interposed between an enlarged lower end section 12, and an enlarged upper end section 13. The inner circumferential surfaces of sections 11 and 12 are lined with refractory material 14, such as firebrick, which brick are disposed in such manner as to present a substantially smooth face. The inner circumferential face of the section 13 is also lined with refractory material 15, such as firebrick, the brick however, in this case being disposed in a manner to form a series of annular baffle rings spaced apart by bricks 16 and 17 which are disposed to form pockets between the annular rings, as clearly shown in Figures 3 and 4. This arrangement of the firebrick in the end section 13 causes the material being treated to be caught or trapped in the end pockets as it is fed into the kiln and as the kiln rotates, the material is carried upward in the pockets until it drops downward through the kiln. Due to the pitch of the kiln, the material will fall over the successive baffle rings formed by brick 15, and as the kiln rotates the material will advance slowly through section 13 until it passes into section 11. The disposition of the refractory lining in the manner indicated compels the material to pass in a tortuous manner causing intimate contacting and commingling thereof with the heated air and the products of combustion, thereby preventing the particles of waste materials from passing through section 13 until substantially all of the moisture carried thereby has been eliminated or removed, and the temperatures thereof have been raised to a point where ignition of the organic matter will readily occur in central section 11.

The open end of the lower end section 12 is normally closed by a removable plate 18 provided with air vents 19 of a size sufficient to allow a suitable draft to be maintained through the kiln. Plate 18 may be removed when desired to permit a fire to be started in the kiln, preferably at the start of the operation, and to remove the completely treated materials at the end of an operation.

The open end of the upper end section 13 is partially closed by a cap 20 provided with a central opening 21 therethrough. The opening 21 communicates with a flue 22, which may be of any desired construction. Within the throat of the flue 22 is mounted a damper 23 to regulate the combustion within the kiln.

Passing downward through flue 22 and extending through the opening 21 into the upper end of section 13 is a feed chute 24 for the introduction of the waste material to be treated to the kiln. The outlet of the chute 24 terminates preferably at a point adjacent the baffle wall construction of the inner circumferential face of the upper end section 13 so that the material may be entrained, dispersed, and separated at the point of introduction into the kiln, and thus allow the heated air and products of combustion to intermingle therewith at the start thereof on its course through the kiln.

Secured to the exterior of kiln sections 11 and 13 are tires 25 which rotatably support the kiln on rollers 26 of thrust roller bearings 27. A spur gear 28 driven by a pinion 29 is secured to and drives the kiln. Pinion 29 is supported and driven in any well known manner.

To start the operation of the apparatus outlined above, end plate 18 is removed and a fire is built in the central section 11 of the kiln. The end plate 18 is then replaced, and when the internal temperature of the kiln reaches the proper point, the material to be treated is fed into the kiln through chute 24, and the kiln is started into rotation. It is necessary that sufficient fuel be supplied at the start so that the initial fire in the kiln will supply enough heat energy to dry the material as it advances into section 11, and to initiate the combustion of the organic material contained therein. After combustion of the advancing material has been initiated and a kiln temperature has been reached at which this combustion will be maintained, no fire within the kiln is required as the organic matter in the material is ordinarily ample to sustain the combustion. The heated gases of combustion pass upward through section 13 and are intimately contacted with the material being treated. The watery waste material is fed into the apparatus at such a rate and at such density that as it passes through the upper section 13 of the kiln, it is relieved of its moisture content and in section 11 it is heated to the point of ignition of the combustible material contained therein. When the treated material reaches the central section 11 of the kiln, it is a glowing red mass, due to the burning or combustion of the organic matter contained therein. In passing through the central section 11 of the kiln, the combustible matter is completely consumed leaving a residue of ash which collects in the lower end section of the kiln from which the ash may be removed from time to time as desired. By controlling the damper to regulate the admission of air, the combustion of the organic matter carried by the material treated is effectively and efficiently controlled so that complete reduction of the material as it reaches section 12 is effected.

The ash, after being removed from the kiln, may be treated by leaching or any of the other well known methods to recover the potassium contained therein.

When treating watery waste materials in which the organic matter is insufficient to supply the heat energy necessary to effect drying and to maintain combustion, the material may be previously concentrated to a point where combustion may be sustained in the kiln, or sufficient extraneous fuel may be supplied through a suitable oil burner (not shown) projecting through plate 18 at the lower end of the kiln, or in any other desired manner to supply the deficiency. Instead of building a fire in the kiln to initiate operation, suitable oil burners may be utilized, and in treating waste with a deficiency of organic matter, after operation has been initiated the fuel supply may be reduced to a point where combustion will just be maintained.

It will be apparent that a novel apparatus has been provided in which waste materials are continuously dried to a point where the organic matter contained therein will burn and supply heat energy for drying and igniting fresh material, enabling the materials to be reduced to ash form without the use of extraneous fuel beyond the amount necessary to initiate combustion, and to supply sufficient fuel during operation to maintain combustion when the organic matter is in itself insufficient. This enables the recovery of valuable by-products to be carried out on an efficient, economical and profitable commercial scale.

Having described preferred embodiments of the invention, what is desired to be secured by Letters Patent and claimed as new is:

1. The process of reducing organic waste materials containing potassium and like compounds to ash form which comprises conveying said materials slowly through an enlarged tortuous passage in contact with a heated gaseous medium to eliminate the moisture therefrom to the point where the organic material contained therein is ready to burn under its own heat of combustion, initiating the combustion of the organic matter carried by said material in a reduced passage, and propagating the combustion of said organic matter continuously, through said material in said reduced passage.

2. The process of reducing materials containing potassium and like compounds to ash form which comprises conveying said materials at a relatively slow rate through a tortuous passage in contact with a heated gaseous medium to eliminate the moisture therefrom to the point where the organic material contained therein is ready to burn under its own heat of combustion, initiating the combustion of the organic matter carried by said material, then conveying the ignited material at an increased rate through a passage in a manner to propagate the combustion of said organic matter through the material.

3. The process of reducing organic materials containing potassium and like compounds to ash form which comprises dispersing the materials in a moving tortuous passage; contacting the dispersed materials with a heated gaseous medium during the course of travel thereof through said passage to eliminate the moisture therefrom to the point where the organic material contained therein is ready to burn under its own heat of combustion, initiating the combustion of the organic matter carried by said materials at the end of its travel through said passage; sustaining the combustion of the organic matter carried by said materials by the heat generated due to the combustion of the organic matter contained therein; and recovering the treated material in ash form.

4. A process of reducing materials containing potassium and like compounds to ash form which comprises passing the same at a relatively slow rate through an enlarged passage and intimately contacting the same with a heated relatively slow moving gaseous medium in a manner to condition the organic matter contained therein for combustion; igniting the conditioned organic matter contained therein, and then passing the material through a reduced passage at a relatively increased rate of speed and contacting the same with said gaseous medium moving at a relatively higher rate of speed in a manner to propagate combustion of the organic matter throughout the material.

5. A process of reducing materials containing potassium and like compounds to ash form which comprises passing the same at a relatively slow rate through an enlarged passage and intimately contacting the same with a heated relatively slow moving gaseous medium in a manner to condition the organic matter contained therein for combustion; igniting the conditioned organic matter contained therein and then passing the material through a reduced passage at a relatively increased rate of speed and contacting with said gaseous medium moving at a relatively higher rate of speed in a manner to propagate combustion of the organic matter throughout the material.

In testimony whereof I affix my signature.

HOWARD A. NIBECKER.